United States Patent
Edpalm et al.

(10) Patent No.: US 10,979,711 B2
(45) Date of Patent: Apr. 13, 2021

(54) METHOD AND ENCODER SYSTEM FOR ENCODING VIDEO

(71) Applicant: Axis AB, Lund (SE)

(72) Inventors: Viktor Edpalm, Lund (SE); Alexander Toresson, Lund (SE)

(73) Assignee: Axis AB, Lund (SE)

( * ) Notice: Subject to any disclaimer, the term of this patent is extended or adjusted under 35 U.S.C. 154(b) by 124 days.

(21) Appl. No.: 15/816,538

(22) Filed: Nov. 17, 2017

(65) Prior Publication Data
US 2018/0146196 A1    May 24, 2018

(30) Foreign Application Priority Data

Nov. 18, 2016  (EP) ..................................... 16199449

(51) Int. Cl.
*H04N 19/61*  (2014.01)
*H04N 19/149* (2014.01)
(Continued)

(52) U.S. Cl.
CPC ......... *H04N 19/124* (2014.11); *H04N 19/136* (2014.11); *H04N 19/137* (2014.11);
(Continued)

(58) Field of Classification Search
CPC .... H04N 19/176; H04N 19/196; H04N 19/13; H04N 19/146; H04N 19/61;
(Continued)

(56) References Cited

U.S. PATENT DOCUMENTS 6,163,573 A    12/2000 Mihara
8,363,729 B1    1/2013 Sha et al.
(Continued)

FOREIGN PATENT DOCUMENTS

EP    1 351 517 A2    10/2003
EP    1 351 517 A3    10/2003
EP    2 282 545 A1    2/2010

OTHER PUBLICATIONS

"GOP Level Rate-Control for Real-Time Video Transmission"; Sanghyun Park; International Journal of Multimedia and Ubiquitous Engineering; vol. 8, No. 4 (Jul. 2013) pp. 207-215.
(Continued)

*Primary Examiner* — Patrick E Demosky
(74) *Attorney, Agent, or Firm* — Volpe Koenig (57) ABSTRACT

A method for encoding video is disclosed wherein information representative of pixels in an image frame is received, and a spatial statistical measure of said information is calculated for groups of neighbouring pixels to form a group value for each group of pixels. A set of available quantization steps is determined comprising a first predetermined quantization step. For a first group of neighbouring pixels, the method comprises: for each available quantization step calculating a remainder after division of the group value of the first group of pixels by the respective available quantization step. The quantization step of the set that results in the smallest remainder is selected as selected quantization step. The first group of pixels is encoded using the selected quantization step. A method of encoding differences between image frames is also disclosed, as well as encoding systems.

15 Claims, 5 Drawing Sheets

(51) Int. Cl.
*H04N 19/124* (2014.01)
*H04N 19/136* (2014.01)
*H04N 19/18* (2014.01)
*H04N 19/176* (2014.01)
*H04N 19/146* (2014.01)
*H04N 19/137* (2014.01)
*H04N 19/182* (2014.01)
*H04N 19/513* (2014.01)

(52) U.S. Cl.
CPC ......... *H04N 19/146* (2014.11); *H04N 19/176* (2014.11); *H04N 19/18* (2014.11); *H04N 19/182* (2014.11); *H04N 19/513* (2014.11)

(58) Field of Classification Search
CPC .. H04N 19/124; H04N 19/149; H04N 19/172; H04N 19/152; H04N 19/154; H04N 19/17; H04N 19/179; H04N 19/192; H04N 19/60
See application file for complete search history.

(56) References Cited

U.S. PATENT DOCUMENTS

| | | |
|---|---|---|
| 2005/0084007 A1 | 4/2005 | Lightstone et al. |
| 2007/0086523 A1 | 4/2007 | Yan |
| 2009/0169125 A1* | 7/2009 | Huguenel ............... H04N 19/60 382/251 |
| 2010/0315557 A1 | 12/2010 | Mathew et al. |
| 2011/0019930 A1* | 1/2011 | Koyabu ............... H04N 19/159 382/238 |
| 2011/0182524 A1* | 7/2011 | Shibata ............... H04N 19/176 382/251 |
| 2011/0200102 A1* | 8/2011 | Saitoh ............... H04N 19/176 375/240.03 |
| 2011/0268180 A1 | 11/2011 | Srinivasamurthy et al. |
| 2012/0093219 A1 | 4/2012 | Varghese |
| 2015/0071343 A1 | 3/2015 | Novotny |

OTHER PUBLICATIONS

"Digital Video: An Introduction to MPEG-2, Chapter 7" (Jan. 1, 1997), Digital Video, Kluwer Academic Publishers, Boston, MA; pp. 146-155; XP002153352.
EP 16 19 9449.6 European Search Report (dated Apr. 24, 2017).

* cited by examiner

METHOD AND ENCODER SYSTEM FOR ENCODING VIDEO

FIELD OF INVENTION

The present invention relates to encoding digital video data, and more particularly to encoding employing quantization.

BACKGROUND

In digital video systems, such as network camera monitoring systems, video sequences are compressed before transmission using various video encoding methods. In many digital video encoding systems, two main modes are used for compressing video frames of a sequence of video frames: intra mode and inter mode. In the intra mode, the luminance and chrominance channels are encoded by exploiting the spatial redundancy of the pixels in a given channel of a single frame via prediction, transform, and entropy coding. The encoded frames are called intra-frames, and may also be referred to as I-frames. Within an intra-frame, blocks of pixels, also referred to as macroblocks, coding units or coding tree units, are encoded in intra-mode, meaning that they are encoded with reference to a similar block within the same image frame, or raw coded with no reference at all. The inter mode instead exploits the temporal redundancy between separate frames, and relies on a motion-compensation prediction technique that predicts parts of a frame from one or more previous frames by encoding the motion in pixels from one frame to another for selected blocks of pixels. The encoded frames are called inter-frames, and may be referred to as P-frames (forward-predicted frames), which can refer to previous frames in decoding order, or B-frames (bi-directionally predicted frames), which can refer to two or more previously decoded frames, and can have any arbitrary display-order relationship of the frames used for the prediction. Within an inter-frame, blocks of pixels, also referred to as macroblocks, may be encoded either in inter-mode, meaning that they are encoded with reference to a similar block in a previously decoded image, or in intra-mode, meaning that they are encoded with reference to a similar block within the same image frame, or raw-coded with no reference at all.

In both encoding modes, a quantization is usually performed. Generally, the pixel values of a macroblock are subjected to a discrete cosine transform (DCT), thereby transforming the pixel values of the macroblock to the frequency domain. The DCT coefficients are then quantized. Quantization implies mapping input values, which may take a wide range of values, to a countable number of discrete values or levels, so called quantization levels. The size of a step from one level to the next in the quantization may be referred to as a quantization step. By the performance of quantization, the quantized data can be represented using fewer bits than would be required for representing the non-quantized input values. In codecs compliant with the H.264 standard, for instance, the quantization is controlled by a compression value called the quantization parameter, or QP for short.

If the input values are mapped to only a few quantization levels, i.e. large quantization steps, fewer bits will be required for representing the quantized data than if more quantization levels are used. Therefore, when seeking to lower output bitrate of a video encoder, the number of quantization levels may be lowered by choosing a suitable compression value. In other words, the size of the quantization steps may be increased. However, since quantization is irreversible, the compression is lossy, and more information is lost the fewer quantization levels are used. Thus, the quality of the encoded video will generally be lower if high compression values, implying few quantization levels, are used.

Encoding is often controlled by a rate controller, which may employ a constant bitrate (CBR), a maximum bitrate (MBR), or a variable bitrate (VBR). CBR means that the encoder will strive to always output the same bitrate, regardless of what happens in the captured scene. If bandwidth is limited, this may lead to low quality images when there is a motion in the scene, but high quality images when the image is static. In a surveillance or monitoring situation, this is generally not useful, as a scene with motion is normally of more interest than a static scene. With MBR, the bitrate is allowed to vary, as long as it does not exceed the bitrate limit set. The problems related to this approach are similar to the ones associated with CBR. If the MBR limit is set too low, images of a scene with motion may be of low quality. However, if the limit is set higher, in order to accommodate the motion, the output bitrate may be unnecessarily high when encoding images of a static scene. VBR may also be referred to as constant quality bitrate, meaning that the quality of the encoded images should be kept constant, but the output bitrate is allowed to vary depending on what is happening in the scene. This approach may lead to high output bitrate when there is motion in the scene. This is particularly problematic if bandwidth is limited, such as when transmitting encoded images over a mobile network. Similarly, it is problematic if storage is limited, such as when storing images on board the camera, e.g., on an SD card. High output bitrates may also be problematic in large systems of cameras if several cameras transmit images of scenes with motion simultaneously.

Regardless of the bitrate control scheme used by the rate controller, one of the parameters that the encoder can adjust in order to comply with the bitrate set by the rate controller is the compression value, or in other words the quantization step. As already mentioned, a high compression value, i.e. a large quantization step, is expected to give a low output bitrate from the encoder. However, the inventors of the present invention have discovered that this is not always true. In some instances, increasing the compression value from an already high compression value may in fact increase output bitrate. This is detrimental in that bandwidth requirement may become unnecessarily high, while at the same time image quality is low. Hence, there is a need for an improved encoding method.

SUMMARY

The present teachings provide a method of encoding video which makes it possible to reduce output bitrate, while not unnecessarily compromising image quality.

Additionally, the present teachings provide an encoder system which enables efficient use of bits.

According to a first aspect, this is achieved, in full or at least in part, by a method for encoding video, comprising: receiving information representative of pixels in a current digital image frame of a video to be encoded, calculating a spatial statistical measure of said information for groups of neighbouring pixels in said current digital image frame to form a group value for each group of neighbouring pixels, determining a set of available quantization steps comprising a first predetermined quantization step, the method comprising for a first group of neighbouring pixels: for each available quantization step calculating a remainder after division of the group value of the first group of pixels by the respective available quantization step, selecting as selected quantization step the quantization step of the set that results in the smallest remainder, and encoding the first group of pixels using the selected quantization step. Using such an encoding method, it is possible to select a quantization step that is in a sense optimised, such that output bitrate may be curbed, and such that image quality may be kept at an acceptable level.

According to a second aspect, this is achieved, in full or at least in part, by a method for encoding video, comprising: receiving information representative of pixels in a current digital image frame of a video to be encoded, calculating a spatial statistical measure of said information for groups of neighbouring pixels in said current digital image frame to form a group value for each group of neighbouring pixels, determining a set of available quantization steps comprising a first predetermined quantization step, the method comprising for a first group of neighbouring pixels: calculating a group value difference between the group value of the first group of pixels and a corresponding group value of a reference group of pixels in a reference frame, for each available quantization step calculating a remainder after division of the group value difference by the respective available quantization step, selecting as selected quantization step the quantization step of the set that results in the smallest remainder, and encoding the first group of pixels using the selected quantization step. With such a method, it is possible to perform inter-coding with reduced output bitrate and without unduly lowering image quality.

The methods of the first and second aspect may be varied in a number of ways. For instance, the reference frame may be a previously encoded and decoded image frame.

The set of available quantization steps may comprise the predetermined quantization step, at least one larger quantization step, which is larger than the predetermined quantization step, and at least one smaller quantization step, which is smaller than the predetermined quantization step.

If two or more available quantization steps result in equally small remainders after division, the largest of these two or more quantization steps may be selected as selected quantization step.

According to a third aspect, this is achieved, in full or at least in part, by an encoder system for encoding video comprising: a receiving module arranged to receive information representative of pixels in a current digital image frame of a video to be encoded, a group value module arranged to calculate a spatial statistical measure of said information for groups of neighbouring pixels in said current digital image frame to form a group value for each group of neighbouring pixels, a step set determination module arranged to determine a set of available quantization steps comprising a first predetermined quantization step, a calculation module arranged to calculate a respective remainder after division of the group value of a first group of pixels by each of the available quantization steps, a selection module arranged to select as selected quantization step the quantization step of the set of available quantization steps that results in the smallest remainder, and an encoding module arranged to encode the first group of pixels using the selected quantization step. Such an encoding system enables efficient encoding keeping bitrate down while retaining acceptable video quality.

According to a fourth aspect, this is achieved, in full or at least in part, by an encoder system for encoding video comprising: a receiving module arranged to receive information representative of pixels in a current digital image frame of a video to be encoded, a group value module arranged to calculate a spatial statistical measure of said information for groups of neighbouring pixels in said current digital image frame to form a group value for each group of neighbouring pixels, a difference module arranged to calculate a group value difference between the group value of a first group of pixels and a corresponding group value of a reference group of pixels in a reference frame, a step set determination module arranged to determine a set of available quantization steps comprising a first predetermined quantization step, a calculation module arranged to calculate a respective remainder after division of the group value difference of the first group of pixels by each of the available quantization steps, a selection module arranged to select as selected quantization step the quantization step of the set of available quantization steps that results in the smallest remainder, and an encoding module arranged to encode the first group of pixels using the selected quantization step. Such an encoding system enables efficient inter-frame encoding keeping bitrate down while retaining acceptable video quality.

The encoding systems of the third and fourth aspects may generally be embodied in the same ways as the methods of the first and second aspects with accompanying advantages.

According to a fifth aspect, this is achieved, in full or at least in part, by a computer program product comprising a computer-readable storage medium with instructions adapted to carry out the method of the first or second aspect when executed by a processor.

According to a sixth aspect, this is achieved, in full or at least in part, by a camera comprising an encoding system in accordance with the third or fourth aspect.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The invention will now be described in more detail by way of example and with reference to the accompanying schematic drawings, in which.

DETAILED DESCRIPTION OF THE PREFERRED EMBODIMENTS

Figure 1:
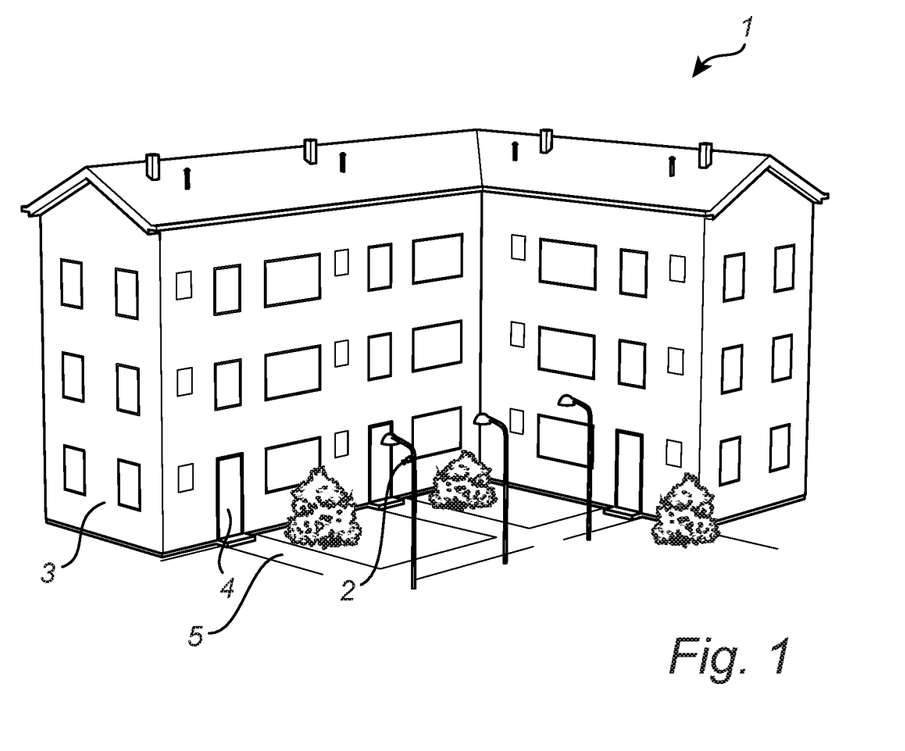
FIG. 1 is a perspective view of a scene monitored by a camera.

In FIG. 1, a scene 1 is shown monitored by a camera 2. In the scene 1, there is a building 3, with a number of doors 4 and paths 5 leading up to each door 4. The purpose of monitoring the scene 1 may, for instance, be to keep an eye on people approaching the building 3 or moving around near the building 3.

Figure 2:
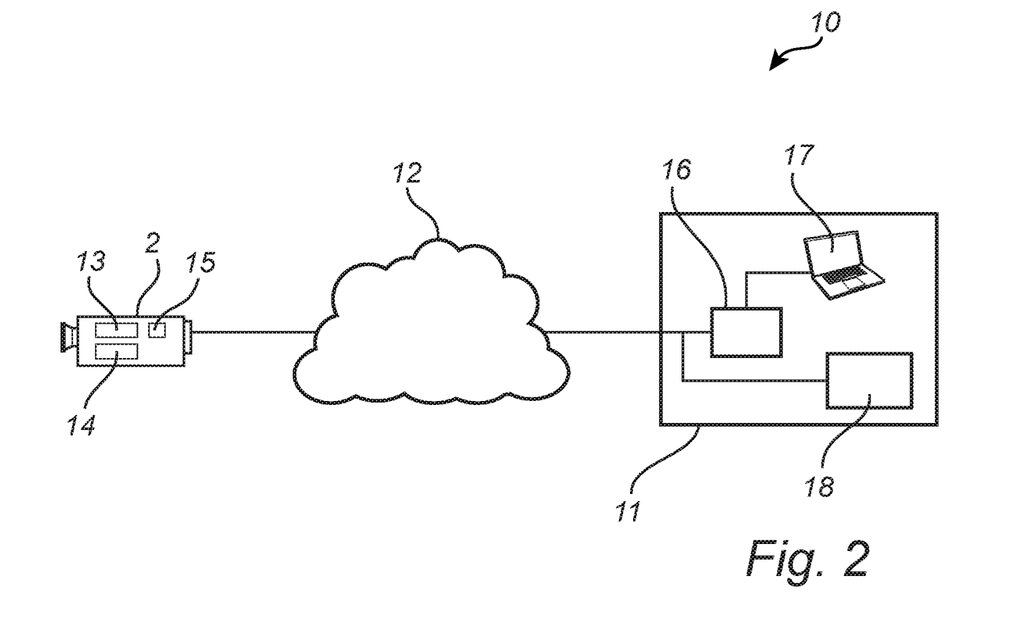
FIG. 2 is a block diagram of a monitoring system including a camera and an encoder in one location, and an encoder, a display, and a storage device in another location.

FIG. 2 shows an example of a monitoring system 10, of which the camera 2 forms part. The monitoring system 2 includes the camera 2 and a control centre 11. The control centre 11 may be in a location remote from the scene 1 monitored by the camera 2. A network 12 connects the camera 2 and the control centre 11. The network 12 may be any kind of network suitable for transmitting video data, and it may be wired or wireless. The camera 2 has an encoder 13, which may be integrated in the camera 2 or may be an external unit connected to the camera 2. In the camera 2, there is an on-board storage device 14, which may be in the form of an SD card. Alternatively, or additionally, the camera may be connected to another storage device (not shown), such as a network attached storage, also referred to as a NAS. Further, the camera has a rate controller 15, which is arranged to set a bitrate limit for the encoder. The rate controller 15 may be integrated in the camera 2, or may be otherwise operatively connected to the camera 2. The camera also has other components, known per se, which are not shown and which will not be discussed further here. In the control centre 11, there is a decoder 16 arranged to decode video data that has been encoded by the encoder 13 and transmitted over the network 12 to the control centre 11. Further, there is a display 17 for displaying live and/or recorded video, such that an operator may see what happens in the monitored scene 1. Additionally, there is a storage display 18 for recording video. The storage display 18 is shown as arranged in the control centre 11, but it should be noted that it may be arranged elsewhere. For instance, the storage display 18 may be a disk drive of a computer (not shown) in the control centre 11. Such a computer may also be connected to the display 17. The storage device may alternatively or additionally be a NAS, or it may be a so-called cloud storage. The control centre 11 is just one example of a location to which images from the camera 2 could be transmitted. Additionally or alternatively, images from the camera 2 may be transmitted to a mobile phone (not shown) of a user. For instance, when motion is detected in the scene 1, the camera 2 may be triggered to transmit a notification, a snapshot or a video sequence to the user's mobile phone. Images may in such case be displayed on a display of the mobile phone and/or stored in the mobile phone.

When the camera 2 captures images of the scene 1, the images are encoded by the encoder 13 before storage on board or in connection to the camera and/or transmission to, e.g., a control centre 11, where the encoded images are received.

The received images may be stored in the storage display 18 for possible later viewing. They may also be decoded by the decoder 16 for displaying on the display 17 in real time, or at least near real time.

It is generally necessary to keep bitrate from the encoder 13 of the camera 2 down. This may be because available storage, e.g., on an SD card, is limited. It may also be because transmission bandwidth from the camera 2 is limited, such as when image data is sent on a mobile network. Further, even in a monitoring system with more generous bandwidth, there may be many cameras, and if several of these cameras transmit image data at the same time, bandwidth consumption may get too high. As already mentioned in the background section, one parameter that may be adjusted in order to control output bitrate is the compression value or quantization step. There are also other parameters that can be adjusted, such as image resolution and frame rate, but these will not be discussed here.

For monitoring or surveillance purposes, images of a static scene are often not of interest. Therefore, such images may be heavily compressed in order to reduce output bitrate, and the ensuing quality degradation is generally an acceptable price to pay. Some encoders compress different parts of an image differently. For instance, portions of the image determined to represent background in the scene may be more heavily compressed than portions determined to represent foreground. In this manner, the available bandwidth may be put to better use than if the whole image is compressed to the same degree.

Still, the inventors of the present inventions have discovered that sometimes an increase of the compression value, i.e. an increase of the quantization step, results in an unchanged or even increased bitrate. The increased compression value still leads to lowered image quality, but that image quality loss does not pay off in reduced bitrate.

The quantization step should be selected wisely, not only picking as large a quantization step as possible in relation to the desired image quality and prevailing bitrate limit. This concept will now be described by way of a simplified example and with reference to FIG. 3.

Figure 3:
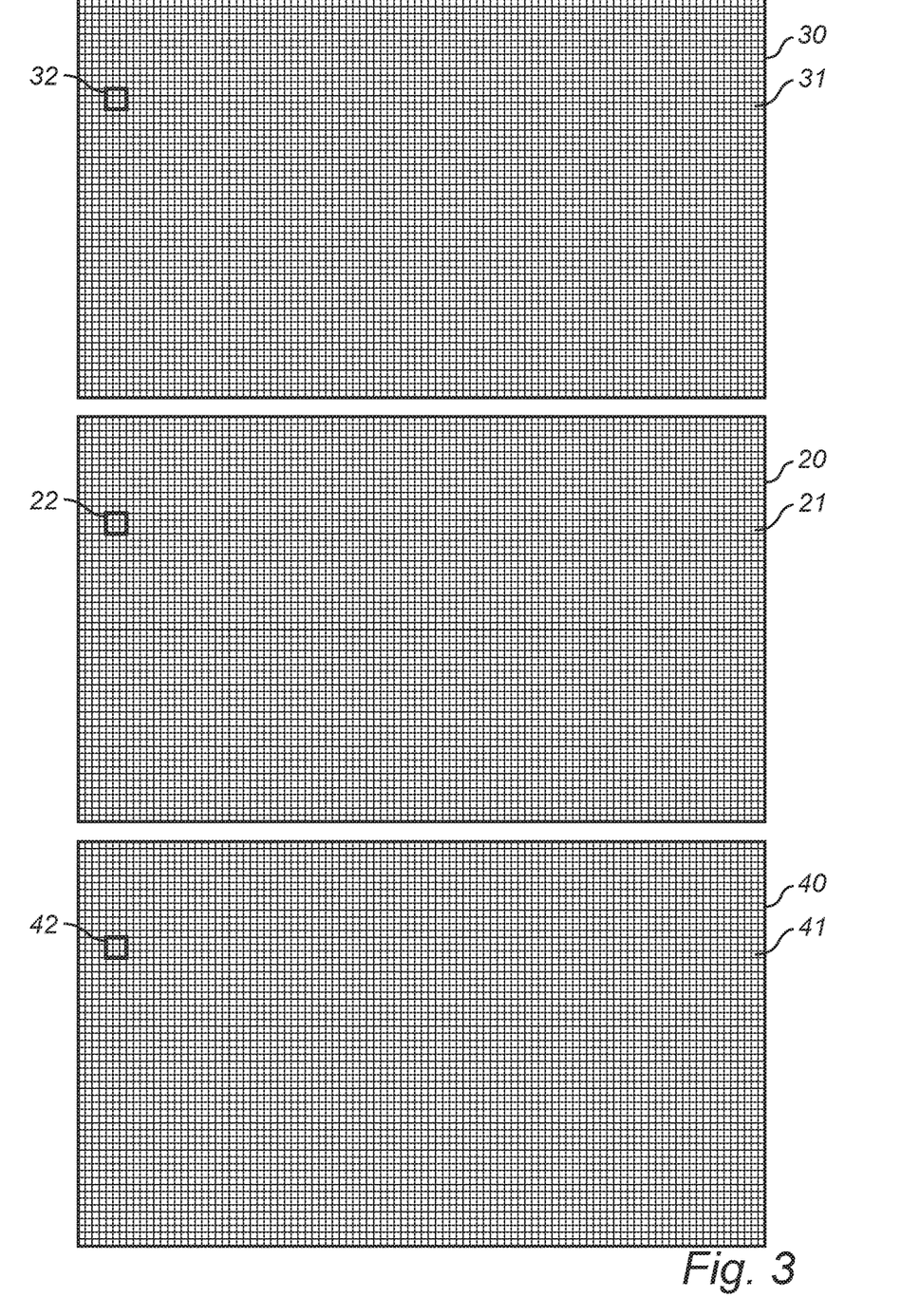
FIG. 3 is a diagram showing a first image frame, a reference frame, and a second image frame.

FIG. 3 is an illustration of a first image frame 20, which is to be encoded, a reference frame 30, and a second image frame 40. The reference frame 30 is an image frame which has been encoded and decoded prior to encoding of the first image frame 20. It may here be noted that at the start of a group of pictures, there will be an I-frame, which is thus encoded without reference to any other frame. Unless the GOP length, i.e. the length of the group of pictures, is zero, the next frame is to be encoded as a P-frame (or possibly a B-frame). For this P-frame, the reference frame will be the result of decoding the preceding I-frame. For the next P-frame in line, the reference frame will be the result of decoding the preceding P-frame, which is thus influenced by the preceding P-frame, as well as the preceding I-frame, i.e. all the preceding frames in the group of pictures.

The first image frame 20 is made up of a number of pixels 21, which may be grouped into groups 22 of neighbouring pixels 21. As noted in the background section, the groups of pixels may also be referred to as, e.g., blocks, macroblocks, coding units, or coding tree units. Likewise, the reference frame 30 is made up of a number of pixels 31, which may be grouped into reference groups 32 of neighbouring pixels 31. Analogously, the second image frame 40 is made up of a number of pixels 41, which may be grouped into groups 42 of neighbouring pixels 41. The number of pixels in each image 20, 30, 40 depends on the number of pixels of an image sensor (not shown) in the camera 2 capturing the images 20, 30, 40. In some cases, the number of pixels in the images 20, 30, 40 may be scaled down, or in some instances scaled up, from the number of pixels of the image sensor, but this will not be discussed further here.

In this example, the first image frame 20 is a current image frame to be encoded as an inter-frame, or more specifically as a P-frame, with reference to the reference frame 30. The skilled person will realise that the same principle may be used for a B-frame, which uses two or more reference frames.

When encoding an inter-frame, differences between a current frame and a reference frame are determined and encoded. For each group or block of pixels, a search is made in the reference frame, and if a sufficiently similar block is found, that block is used as reference block. In simple terms, a pixel block is encoded with information of a motion vector, which tells how much the block to encode is displaced in relation to the reference block, and with information of intensity value differences, also referred to as a residual, compared to the reference block, which tells how different the block is from the reference block. If no sufficiently similar block is found, the block is encoded using intra-coding, i.e. without reference to any other frame.

As an example, a first group of pixels 22 all having the pixel value 74 is to be encoded. After a motion vector search, known per se, has been performed, a reference group 32 of pixels has been identified in the reference frame 30. In this example, the reference group 32 is located in a position in the reference frame 30 which corresponds to the position of the first group 22 of pixels in the current frame 20. Therefore, the motion vector will be of length zero and will not be discussed further here. The following description will, however, be valid also with a non-zero motion vector.

The pixels in the reference group all have the pixel value 70. For the first group of pixels 22 a first group value $V_1$ may be calculated as a mean of the values of all pixels in the group 22. Since all pixels in the first group 22 have the value 74, the first group value $V_1$ will be 74. Similarly, a reference group value $V_{R1}$ is calculated for the reference group 32 as the mean of the pixel values in the reference group 32. This reference group value $V_{R1}$ is 70. A difference between the first group value $V_1$ and the reference group value $V_{R1}$ is calculated:

$$V_{Diff1} = V_1 - V_{R1}$$

In this example, the group value difference $V_{Diff1}$ is $$V_{Diff1} = 74 - 70 = 4.$$

Here, the rate controller 15 has set a bitrate limit which has made the encoder choose a quantization step of 10 for the first group 22 of pixels. The group value difference $V_{Diff1} = 4$ may be determined by the encoder to be too large to be encoded with inter-coding, as a P-block, and the encoder may therefore encode it using intra-coding, as an I-block. With a quantization step of 10, the value 74 could be encoded as 7×10, i.e. 70, or as 8×10, i.e. 80. Since 74 is closer to 70 than to 80, the encoder encodes the value as 7 (or rather 111 as binary number).

When the current image frame 20 has been encoded and is later decoded, dequantization will produce a value for the first group 22 of pixels by multiplying the encoded number 7 by the quantization step 10, returning a value of 70. It may be seen that information is hereby lost, since the original pixel value of the first group 22 was 74.

If the scene is static, a second image frame 40, following the first image frame 20, will also have a group value $V_2$ of 74 for a second group 42 of pixels corresponding to the first group of pixels 22. The same situation occurs again, with the second group 42 of pixels being encoded as an I-block with the quantized value 7, even though the scene has not changed. Further, quality of the image is compromised, since gradients in the original image frame are either lost or exaggerated. With a quantization step of 10, pixel values between 70 and 80 can only be encoded as either 7 (i.e. 70) or 8 (i.e. 80). Thus, blocks or groups of pixels with values of 71, 72, 73, and 74 will all get the value 70 after encoding and decoding, with all variations there between lost in quantization. Similarly, blocks with values of 76, 77, 78, and 79 will get the value 80 after encoding and decoding. Blocks with the value 75 may end up as either 70 or 80, depending on the rounding performed in the encoder. At a border between two rather similar blocks with values of 74 and 76, respectively, in the original image frame, the quantization will artificially create contrast, since one block will get the value 70 and the other will get the value 80.

For a static scene, it may be expected that inter-frame encoding is more efficient than intra-frame encoding, as inter-frame encoding encodes only the changes between images. This simplified example illustrates that this is not necessarily the case, as a P-frame with many I-blocks will generally be larger, i.e. require more bits, than a P-frame with more P-blocks, or only P-blocks.

The inventors have realised that it may be wiser to use a smaller quantization step, even if this is counterintuitive in terms of lowering output bitrate. Returning to the example above, if a quantization step of 4 were used instead, the group value difference $V_{Diff1} = 4$ would no longer be considered too large for encoding as a P-block, since the value 4 corresponds precisely to a quantization level. The first group 22 of pixels could in such case be encoded with the information that it has a value that differs from the value of the reference group 32 by 1 quantization step. Encoding the number 1 (1 also as binary number) requires fewer bits than encoding the number 7 (111 as binary number) as described above for encoding the first group 22 as an I-block. It should be noted that in some situations, the same approach will show that it is wiser to use a larger quantization step.

In the same way as described before, when the first image frame 20 has been encoded, it is later decoded, and by dequantization the value of the first group 22 is calculated as the value of the reference group 32 plus the difference between the first group 22 and the reference group 32, i.e. 70+1×4=74. This decoded image frame is then used as reference frame for encoding the second image frame 40. With the same static scene as before, the value of the second group 42 of pixels is 74. The difference between the second group 42 of pixels and the corresponding group of pixels in the encoded and decoded previous frame is therefore 0. Rather than encoding the second group 42 of pixels with the information that it differs from the corresponding group 22 in the previous frame by 0, the second group 42 of pixels may be encoded as a skip block, meaning that the decoder is given the information that the block should be copied from the previous frame. In this manner, even though the quantization step is smaller, the output bitrate becomes lower.

Figure 4:
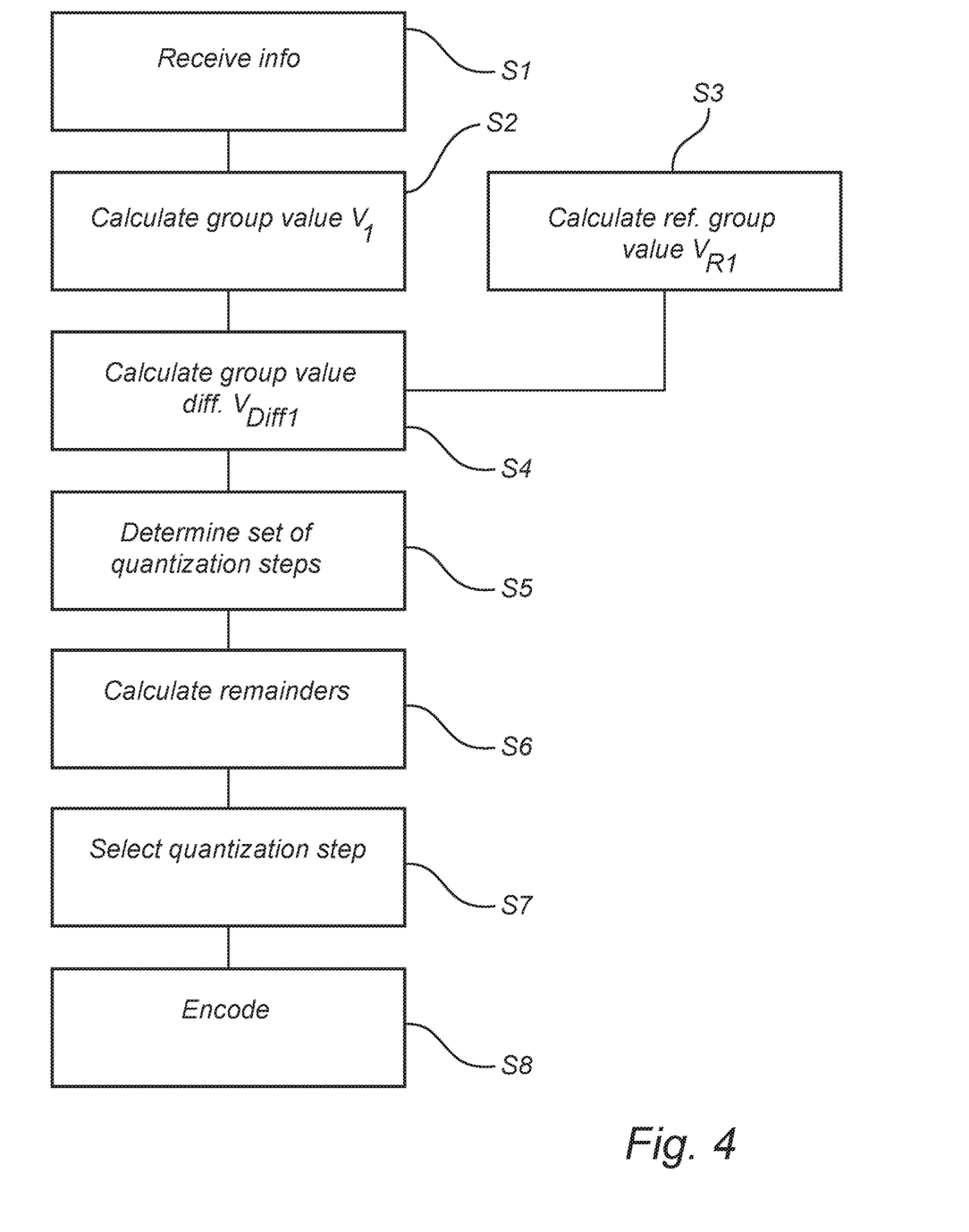
FIG. 4 is a flowchart of a method of encoding video according to the second aspect of the invention.

With this realisation in mind, an improved method of encoding will be described further with reference to FIG. 4. According to the method, information representative of the pixels in the first image frame is received (S1). This information may, e.g., be intensity values of the pixels, or it may be luminance values. The group value $V_1$ of a group 22 of pixels in the current image frame 20 is calculated (step S2) and the group value $V_{R1}$ of the corresponding reference group 32 of pixels in the reference frame 30 is calculated (S3). These two group values $V_1$, $V_{R1}$ are compared to calculate the group value difference $V_{Diff1}$ (S4). Then, instead of simply using a predetermined quantization step $QS_0$, determined by the encoder in order to comply with a bitrate limit set by the rate controller 15, a set of available quantization steps AQS is determined (S5). This set includes the predetermined quantization step $QS_0$ and a number of smaller and/or larger quantization steps. For instance, the predetermined quantization step $QS_0$ may be 5, and the set of available quantization steps may be determined as 4, 5, 6, and 7, i.e. AQS={4, 5, 6, 7}. Denoting the larger quantization steps $QS_{+n}$ and the smaller quantization steps $QS_{-n}$ the set of available quantization steps may in this example be expressed as $$AQS=\{QS_{-1}, QS_0, QS_{+1}, QS_{+2}\}.$$

For each available quantization step, the group value difference $V_{Diff1}$ is divided by the respective quantization step and the remainder of the division is calculated (S6). In this example, the group value difference $V_{Diff1}=4$ is divided by each of 4, 5, 6, and 7 to produce the following remainders:

4/4=1 remainder 0
4/5=0 remainder 4
4/6=0 remainder 4
4/7=0 remainder 4

It may be seen that the quantization step 4 produces the smallest remainder, namely 0. That quantization step of the set of available quantization steps AQS which results in the smallest remainder is selected as selected quantization step SQS (S7). Thus, in this example, the selected quantization step SQS is 4. The first group of pixels 22 should therefore be encoded using the selected quantization step SQS=4 (S8). This procedure is used for all groups of pixels 22 of the first image frame 20.

In this context, it should be pointed out that some encoders perform a rounding that will give a slightly different result. For instance, with a quantization step of 5, the division of the group value difference $V_{Diff1}=4$ by the quantization step $QS_0=5$ will compute as 1, and not as 0 remainder 4. Quantization and dequantization will therefore yield a value of 70+1×5=75, rather than the original 74.

The encoded image frame may then be stored on the SD-card 14 and/or transmitted over the network 12 to the control centre 11. Additionally, the encoded image frame is decoded by the encoder 13 to produce an updated reference frame, to be used when encoding the second image frame 40. Thus, the second image frame 40 becomes the current image frame, and is encoded using the encoded and decoded first image frame 20 as reference. The same procedure is used for the second image frame, thus calculating the group value $V_2$ of the second group of pixels 42 (S2), calculating the group value $V_{R2}$ of the corresponding group of pixels of the updated reference frame (S3), calculating the group value difference $V_{Diff2}$ (S4), determining a set of available quantization steps (S5), dividing the group value difference by each of the available quantization steps to get the respective remainder (S6), selecting the quantization step that results in the smallest remainder (S7), and encoding the second group of pixels 42 using the selected quantization step (S8). This process is performed for all groups of pixels 42 of the second image frame 40. The encoded second image frame can now be stored and/or transmitted. It may also be decoded by the encoder 13 to produce a further updated reference frame for encoding of subsequent image frames.

So far, inter-frame encoding has been described, but the same principle may be employed for intra-frame encoding.

Figure 5:
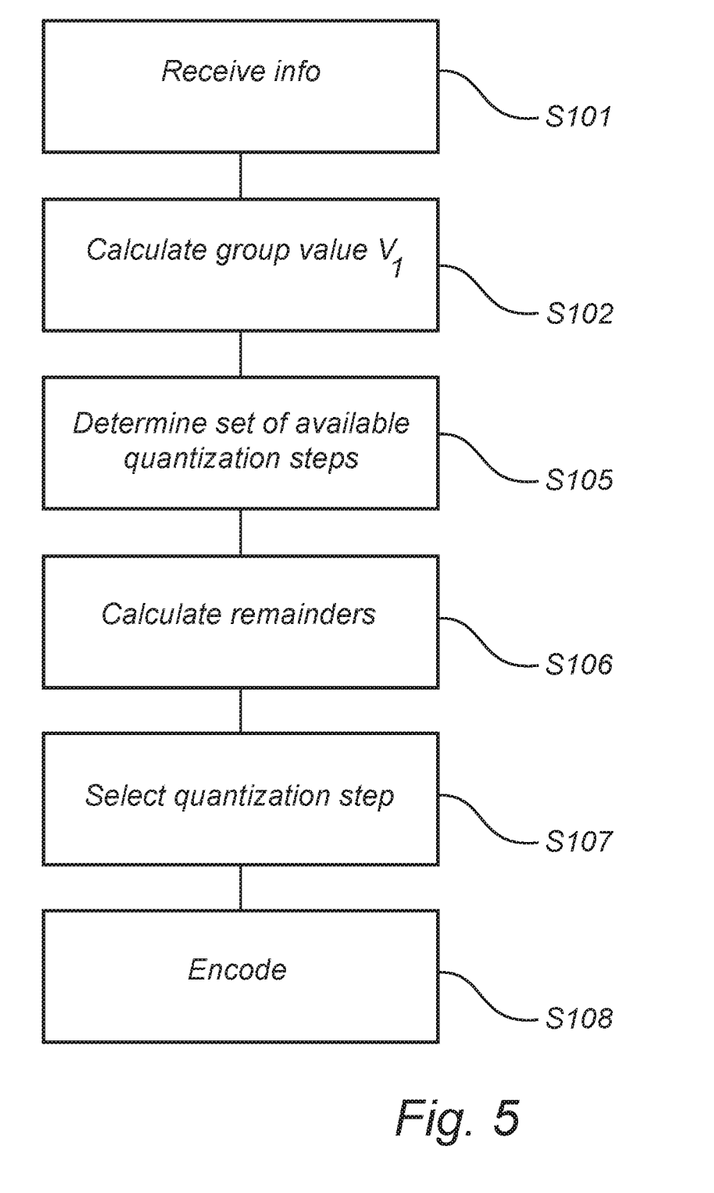
FIG. 5 is a flowchart of a method of encoding video according to the first aspect of the invention.

The approach for intra-frame encoding differs from the one for inter-frame encoding in that it is the group value, and not a group value difference, that is divided by each available quantization step. With reference to FIG. 5, this method will be described in more detail in the following. Here, it is assumed that the first image frame 20 is to be encoded using intra-coding. As before, information representative of the pixels in the first image frame 20 are received (S101). For groups of neighbouring pixels, group values are calculated by calculating a statistical measure of the pixel information. Here, too, the mean of the pixel values is calculated. In particular, the group value $V_1$ of the first group of pixels is calculated (S102). In this example, the same pixel values are used as for the intercoding example are used, and the group value $V_1$ of the first group of pixels 22 is therefore 74. A set of available quantization steps AQS is determined (S105), which includes a predetermined quantization step $QS_0$. Using the same values as for the inter-coding example, the predetermined quantization step is 5, and the set of available quantization values is AQS={4, 5, 6, 7}. The group value $V_1$ is divided by each of the available quantization steps to calculate the remainder (S106) as follows:

74/4=18 remainder 2
74/5=14 remainder 4
74/6=12 remainder 2
74/7=10 remainder 4

In this example, it may be seen that there are two quantization steps producing the same smallest remainder, namely 4 and 6, which both result in a remainder of 2. Either of these could be selected as the selected quantization step (S107). If image quality has higher priority than bitrate reduction, the quantization step 4 could be selected. However, bitrate reduction will in many cases be of higher priority than image quality, and in such case the quantization step 6 should be selected. The first group 22 of pixels is then encoded using the selected quantization step (S108). The same process is used for all groups of pixels of the first image 20. The encoded image frame may then be stored and/or transmitted, and may be decoded to form a reference frame for encoding a subsequent image frame, such as the second image frame 40. Encoding of the second image frame 40 may then be performed in accordance with the inter-frame encoding method described above in connection with FIG. 4.

Figure 6:
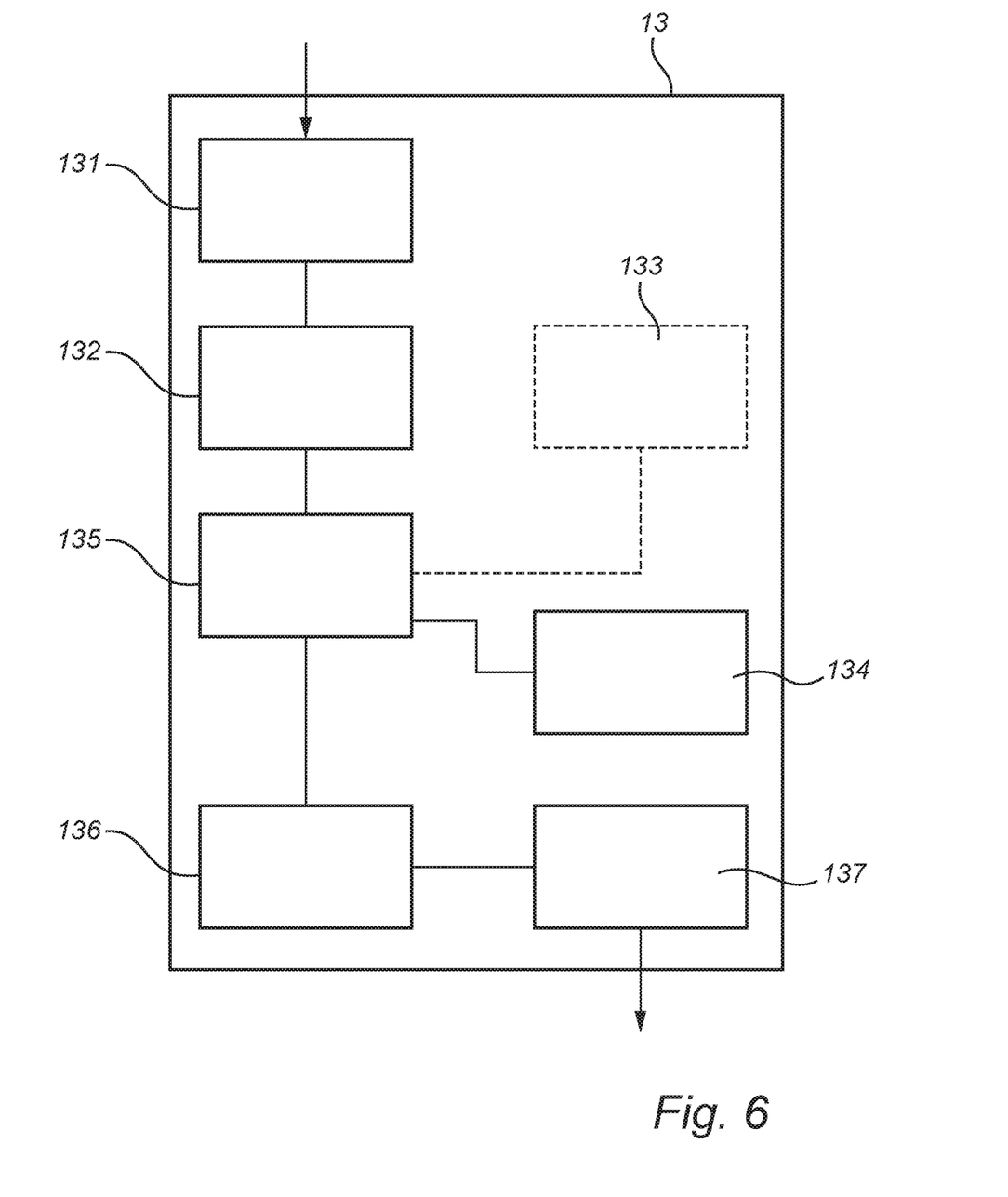
FIG. 6 is a block diagram of an encoder according to an embodiment of the invention.

With reference to FIG. 6, an encoder system 13 will be described, by which the described methods may be performed. The encoder 13 may be integrated in the camera 2, or may be otherwise operatively connected to the camera 2. The encoder 13 has a receiving module 131, which is arranged to receive information representative of pixels in a current digital image frame of a video to be encoded. The information may, as already discussed, e.g., be pixel intensity values. Further, the encoder has a group value module 132 arranged to calculate the group values of groups of neighbouring pixels in the current image frame, and a difference module 133 arranged to calculate a difference between a first group of pixels in the current image frame and a corresponding group value of a reference group of pixels in a reference frame. It should be noted that for intra-frame encoding, the difference module is not necessary. The encoder 13 also has a step set determination module 134 arranged to determine the set of available quantization steps. As discussed above, this set comprises a predetermined quantization step, which is determined based on the bitrate limit set by the rate controller 15. Additionally, the encoder 13 has a calculation module 135, which for intra-coding is arranged to calculate a respective remainder after division of the group value of the first group of pixels by each of the available quantization steps. For inter-coding, the calculation module instead takes as input to the division the group value difference, and not the group value of the first group of pixels per se. The calculation module 135 may be able to perform both types of division, for intra-coding and for inter-coding, or it may be made up of two parts, one for intra-coding and one for inter-coding. A selection module 136 of the encoder 13 is arranged to select as selected quantization step the quantization step of the set that results in the smallest remainder. Further, the encoder 13 has an encoding module 137, which is arranged to encode the first group of pixels using the selected quantization step.

The encoder 13 may be embodied as software, firmware, hardware, or a combination thereof.

The encoding methods described above may be embodied as a computer program product comprising a computer-readable storage medium with instructions adapted to carry out the inventive methods when executed by a processor. The processor may be any kind of processor, e.g., a central processing unit (CPU), a graphics processing unit (GPU), a custom made processing device implemented in an integrated circuit, an ASIC, an FPGA, or logical circuitry including discrete components.

It will be appreciated that a person skilled in the art can modify the above described embodiments in many ways and still use the advantages of the invention as shown in the embodiments above. As an example, the number of different quantization steps in the set may be chosen differently. In the examples above, one quantization step that is smaller than the predetermined quantization step was included, as well as two quantization steps that are larger than the predetermined quantization step. It may in many situations be suitable to have one or two smaller quantization steps, and two or three larger quantization steps in the set in addition to the predetermined quantization step. The quantization steps in the set need not necessarily be equidistant or follow directly one upon the other. For instance, the set could be {4, 6, 7, 10, 11}.

The set of available quantization steps may be determined once for an entire image frame, or separately for each group of pixels, or for a number of groups of pixels.

Above, the group value of a group of neighbouring pixels has been calculated as a mean of the pixel values of the pixels in the group. Instead of the mean, the sum of the pixel values could be calculated.

Further, the group value has been described as being calculated based on pixel values, or intensity values of the pixels in the group. It would also be possible to calculate the group value in the frequency domain. When transforming pixel values into the frequency domain, each block or group of pixels may hold a number of frequencies. A simplified example will now be given in order to illustrate this. A small block or group only two pixels wide and two pixels high will be studied, having the following pixel values:

$$\begin{bmatrix} 36 & 30 \\ 36 & 30 \end{bmatrix}$$

This block has the following possible frequencies:

$$\begin{bmatrix} 1 & 1 \\ 1 & 1 \end{bmatrix}, \begin{bmatrix} 1 & 0 \\ 1 & 0 \end{bmatrix}, \begin{bmatrix} 1 & 1 \\ 0 & 0 \end{bmatrix}, \text{ and } \begin{bmatrix} 1 & 0 \\ 0 & 1 \end{bmatrix}$$

In the frequency domain, this gives the following:

$$\begin{bmatrix} 30 & 6 \\ 0 & 0 \end{bmatrix}, \text{ i.e. } 30\begin{bmatrix} 1 & 1 \\ 1 & 1 \end{bmatrix} + 6\begin{bmatrix} 1 & 0 \\ 1 & 0 \end{bmatrix} + 0\begin{bmatrix} 1 & 1 \\ 0 & 0 \end{bmatrix} + 0\begin{bmatrix} 1 & 0 \\ 0 & 1 \end{bmatrix}$$

It may be seen that 30 is divisible by 1, 2, 3, 5, 6, 10, 15, and 30, while 6 is divisible only by 1, 2, 3, and 6. The largest quantization step by which both 30 and 6 is divisible is thus 6. If, in this case, the predetermined quantization step is 5, and a set of available quantization steps is determined as {4, 5, 6, 7}, division of the group value $$\begin{bmatrix} 30 & 6 \\ 0 & 0 \end{bmatrix}$$

by each of the available quantization steps gives the following calculations:

$$\frac{30}{4} = 7 \text{ remainder } 2 \text{ and } \frac{6}{4} = 1 \text{ remainder } 2$$

$$\frac{30}{5} = 6 \text{ remainder } 0 \text{ and } \frac{6}{5} = 1 \text{ remainder } 1$$

$$\frac{30}{6} = 5 \text{ remainder } 0 \text{ and } \frac{6}{6} = 1 \text{ remainder } 0$$

$$\frac{30}{7} = 4 \text{ remainder } 2 \text{ and } \frac{6}{7} = 0 \text{ remainder } 6$$

In the determined set of available quantization steps, the one that results in the smallest remainder is the quantization step 6, since this results in a remainder of 0 for both frequencies. It will generally be suitable to calculate the group value for the base frequency only, i.e. for $$\begin{bmatrix} 1 & 1 \\ 1 & 1 \end{bmatrix},$$

in this case yielding a group value of 30. Taking more of the frequencies into account may in some cases be possible and advantageous, but may in many cases lead to complicated calculations requiring considerable computing resources.

In summary, it may be seen that the inventive method makes it possible to reduce output bitrate from an encoder, while not unnecessarily sacrificing image quality. The inventive method makes it possible to produce better reference frames for encoding of subsequent image frames. By a wise choice of quantization step, reference frames may be obtained which result in smaller residuals to encode in subsequent image frames, particularly in static portions of the image frames.

As discussed above, the principle developed by the inventors may be used in inter mode as well as in intra mode. It should be noted that it is possible also to use a mixed approach, such that the idea of dividing the group value by each quantization step in a set of available quantization steps is used only for some frames in a group of pictures, also referred to as a GOP, and not for other in the same GOP. For instance, the inventive principle could be used only for inter-frames, or only for intra-frames. It is also possible to use the inventive principle for some of the inter-frames in a GOP, and not for other inter-frames in the same GOP. In such case, it is advantageous to apply the inventive method to image frames in the beginning of the GOP, as the image frames early in the GOP will influence more of the subsequent image frames in the GOP by being involved in forming reference frames. Toward the end of a GOP, each image frame will influence fewer subsequent and will have less impact on the reference frames.

In the description above, the parameter of the encoding that is controlled has been referred to as a quantization step. As noted in the background section, the quantization step may be controlled by parameters of different names in different codecs. For instance, in the H.264 standard, quantization step is controlled by the quantization parameter QP, which may take values of 0-51. In H.264, each increase of 6 in QP corresponds to a doubling of the quantization step. No matter what the parameter is called, each value of the parameter will translate to a quantization step.

The inventive concept is not limited to any particular codec, but may be used with any codec employing quantization. For instance, it may be used with and block based hybrid codec, e.g., a H.265, MPEG-4 Part 2, or VP9 codec.

The images to encode may be captured by any kind of camera, such as a visual light camera, an IR camera, or a thermal camera. The images may also be captured by other kinds of sensors, such as a time-of-flight sensor.

The digital images may be captured by a digital camera, or they may be captured by an analogue camera and converted to digital format using a digitalization unit.

Thus, the invention should not be limited to the shown embodiments but should only be defined by the appended claims.

What is claimed is:

1. A method for encoding video, comprising:
    receiving information representative of pixels in a current digital image frame of a video to be encoded;
    calculating a spatial statistical measure of said information for each group of a plurality of groups of neighbouring pixels in said current digital image frame to form a group value for each group of the plurality of groups of neighbouring pixels; and
    for each group of the plurality of groups of neighbouring pixels:
        determining a set of available quantization steps, the set of available quantization steps comprising a first predetermined quantization step and at least one other quantization step within a range of the first predetermined quantization step,
        dividing the calculated group value by each quantization step in the determined set of available quantization steps to calculate a remainder after the dividing for each respective quantization step,
        selecting a quantization step from the determined set of available quantization steps that has the smallest remainder during the dividing such that output bitrate is reduced when encoding irrespective of a magnitude of the quantization step, and
        encoding the group of neighbouring pixels using the selected quantization step.

2. The method according to claim 1, wherein the set of available quantization steps comprises the predetermined quantization step and at least one larger quantization step, which is larger than the predetermined quantization step.

3. The method according to claim 1, wherein the set of available quantization steps comprises the predetermined quantization step and at least one smaller quantization step, which is smaller than the predetermined quantization step.

4. The method according to claim 1, wherein if two or more available quantization steps result in equally small remainders after division, the largest of these two or more quantization steps is selected as selected quantization step.

5. A method for encoding video, comprising:
    receiving information representative of pixels in a current digital image frame of a video to be encode;
    calculating a spatial statistical measure of said information for each group of a plurality of groups of neighbouring pixels in said current digital image frame to form a group value for each group of the plurality of groups of neighbouring pixels; and
    for each group of the plurality of groups of neighbouring pixels:
        determining a set of available quantization steps, the set of available quantization steps comprising a first predetermined quantization step and at least one other quantization step within a range of the first predetermined quantization step,
        calculating a group value difference between the group value of each group of the plurality of groups of neighbouring pixels and a corresponding group value of a corresponding reference group of pixels in a reference frame,
        dividing the calculated group value by each quantization step in the determined set of available quantization steps to calculate a remainder after the dividing for each respective quantization step,
        selecting a quantization step from the determined set of available quantization steps that has the smallest remainder during the dividing such that output bitrate is reduced when encoding irrespective of a magnitude of the quantization step, and
        encoding the group of neighbouring pixels using the selected quantization step.

6. The method according to claim 5, wherein said reference frame is a previously encoded and decoded image frame.

7. The method according to claim 5, wherein the set of available quantization steps comprises the predetermined quantization step and at least one larger quantization step, which is larger than the predetermined quantization step.

8. The method according to claim 5, wherein the set of available quantization steps comprises the predetermined quantization step and at least one smaller quantization step, which is smaller than the predetermined quantization step.

9. The method according to claim 5, wherein if two or more available quantization steps result in equally small remainders after division, the largest of these two or more quantization steps is selected as selected quantization step.

10. An encoder system for encoding video comprising:
    a memory; and
    an encoder configured to:
    receive information representative of pixels in a current digital image frame of a video to be encoded,
    calculate a spatial statistical measure of said information for each group of a plurality of groups of neighbouring pixels in said current digital image frame to form a group value for each group of the plurality of groups of neighbouring pixels,
    for each group of the plurality of groups of neighbouring pixels:
        determine a set of available quantization steps, the set of available quantization steps comprising a first predetermined quantization step and at least one other quantization step within a range of the first predetermined quantization step, divide the calculated group value by each quantization step in the determined set of available quantization steps to calculate a remainder after the dividing for each respective quantization step, select a quantization step from the determined set of available quantization steps that has the smallest remainder during the dividing such that output bitrate is reduced when encoding irrespective of a magnitude of the quantization step, and encode the group of neighbouring pixels using the selected quantization step.

11. The encoder system according to claim 10, wherein the encoder system is comprised in a camera.

12. An encoder system for encoding video comprising:
a memory; and
an encoder configured to:
receive information representative of pixels in a current digital image frame of a video to be encoded,
calculate a spatial statistical measure of said information for each group of a plurality of groups of neighbouring pixels in said current digital image frame to form a group value for each group of the plurality of groups of neighbouring pixels, and
for each group of the plurality of groups of neighbouring pixels:
determine a set of available quantization steps, the set of available quantization steps comprising a first predetermined quantization step and at least one other quantization step within a range of the first predetermined quantization step,
calculate a group value difference between the group value of each group of the plurality of groups of neighbouring pixels and a corresponding group value of a corresponding reference group of pixels in a reference frame,
divide the calculated group value by each quantization step in the determined set of available quantization steps to calculate a remainder after the dividing for each respective quantization step,
select a quantization step from the determined set of available quantization steps that has the smallest remainder during the dividing such that output bitrate is reduced when encoding irrespective of a magnitude of the quantization step, and
encode the group of neighbouring pixels using the selected quantization step.

13. The encoder system according to claim 12, wherein the encoder system is comprised in a camera.

14. The system of claim 10, wherein the encoder is one of a central processing unit (CPU), graphics processing unit (GPU), integrated circuit (IC), application specific integrated circuit (ASIC), and a field programmable gate array (FPGA).

15. The system of claim 12, wherein the encoder is one of a central processing unit (CPU), graphics processing unit (GPU), integrated circuit (IC), application specific integrated circuit (ASIC), and a field programmable gate array (FPGA).

* * * * *